(12) United States Patent
Satoh et al.

(10) Patent No.: US 6,172,842 B1
(45) Date of Patent: *Jan. 9, 2001

(54) RECORDING DISK APPARATUS

(75) Inventors: Ichi Satoh; Shoji Samma, both of Kanagawa; Toshiyuki Hachiya, Yamagata; Takayuki Bitoh, Kanagawa, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/111,909

(22) Filed: Jul. 8, 1998

(30) Foreign Application Priority Data

Feb. 13, 1998 (JP) ................................. 10-030933

(51) Int. Cl.⁷ .................................................. G11B 17/00
(52) U.S. Cl. .......................................................... 360/97.01
(58) Field of Search .............................. 360/97.01–97.04, 360/98.01

(56) References Cited

U.S. PATENT DOCUMENTS

| 5,214,549 | * | 5/1993 | Baker et al. | 360/97.01 |
| 5,349,486 | * | 9/1994 | Sugimoto et al. | 360/97.01 |
| 5,765,275 | * | 6/1998 | Obara | 360/97.01 |
| 5,822,152 | * | 10/1998 | Seaver et al. | 360/97.01 |

FOREIGN PATENT DOCUMENTS

| 1-60889 | * | 3/1989 | (JP) . |
| 4-102286 | * | 4/1992 | (JP) . |
| 09128955 | * | 5/1997 | (JP) . |

* cited by examiner

Primary Examiner—Allen T. Cao
(74) Attorney, Agent, or Firm—Greer, Burns & Crain, Ltd

(57) ABSTRACT

A housing includes a base plate and a metallic cover. The cover may be formed by deep-drawing. The housing accommodates, for example, a magnetic disk, a magnetic head, and a drive mechanism. The drive mechanism serves to displace the magnetic head with respect to the magnetic disk. When the cover is coupled to the base plate, a screw is screwed, penetrating the cover, into the tip end of the carriage axis for supporting a carriage. Vibration caused by swinging movement of the carriage is transmitted to the cover through the screw. A vibration absorber adhered to the outer surface of the cover is adapted to absorb the transmitted vibration. Noise may be suppressed in the seek operation.

18 Claims, 5 Drawing Sheets

RECORDING DISK APPARATUS

BACKGROUND OF THE INVENTION

1. Field of the Invention

The present invention relates to a recording disk apparatus, which is represented by a magnetic disk apparatus such as a hard disk drive unit (HDD), and in particular, to a housing thereof.

2. Description of the Prior Art

It is well known that a magnetic disk apparatus makes noise in the seek operation because of the rotation of the magnetic disk. The noise is originally caused by vibration which is generated by the rotation of the magnetic disk and transmitted to the housing through the rotation axis and the like. Accordingly, an overall housing with high rigidity, formed by die-casting, serves to suppress the noise. On the other hand, it is preferable to employ a press for forming a housing when taking account of reduction in weight and manufacturing cost. In particular, reduction in manufacturing cost for housings becomes one of the indispensable factors in distributing cheap personal computers in the market.

Currently, most housings comprise a box-shaped housing body formed by die-casting and a cover plate closing the opening of the housing body. This structure enables a cover to be formed with a press. However, a cover with low rigidity tends to vibrate, so that the generation of noise cannot be avoided. It is known to suppress noise by employing a cover made of a vibration suppression metallic plate, which in general comprises a pair of metallic plates sandwiching a synthetic resin layer. The plate may absorb vibration so that the suppression of noise can be achieved.

A housing accommodates many components such as a magnetic disk for recording, a magnetic head for reading and writing information out of and into the magnetic disk, an actuator for driving a carriage supporting at the tip end the magnetic head, a spindle motor for driving the magnetic disk for rotation, and the like. Employment of a box-shaped housing tends to lead to trouble in assembling components, because the side walls of the housing hinder the assembling operation. It is known to overcome this inconvenience by employing a housing comprising a base plate and a cover formed by deep-drawing. This structure allows operators to easily assemble components on the base plate, thereby improving the efficiency in assembling operation.

On the other hand, a cover formed by deep-drawing cannot suppress vibration. Accordingly, a vibration suppression metallic plate is adhered to the outer surface of the cover around a screw which connects the rotation axis of the magnetic disk to the cover, as is disclosed in Japanese Patent Laid-open No. 9-128955, for example.

Recently, some factors, such as improved performance of spindle motors, appropriate management on electric current to spindle motors, and the like, have served to suppress vibration caused by the rotation of a magnetic disk. As a result, vibration generated by driving operation of an actuator comes to occupy large percentage in the cause of the total noise. The vibration from an actuator is transmitted to the cover through the rotation axis of the carriage, thereby making noise.

The employment of the above-described box-shaped housing serves to suppress vibration from an actuator because the overall cover is made from a vibration suppression metallic plate. Still, the increase in thickness of the cover leads to a reduction in the interior space of the overall housing. The technique disclosed in the above mentioned publication completely fails to consider vibration caused by an actuator.

SUMMARY OF THE INVENTION

It is therefore an object of the present invention to provide a housing for a recording disk apparatus, capable of suppressing vibration from a drive mechanism for displacing the head with respect to the recording disk, even if the housing comprises a base plate and a cover formed by deep-drawing.

It is another object of the present invention to provide a housing for a recording disk apparatus, capable of avoiding suppression of the interior space within the housing while reducing noise caused by the drive mechanism.

According to a first aspect of the present invention, there is provided a recording disk apparatus comprising: a recording disk; a head; a drive mechanism capable of displacing the head with respect to the recording disk; a base on which at least the drive mechanism is mounted; a metallic cover formed by deep-drawing, to accommodate at least the drive mechanism when it is coupled to the base; a connecting mechanism disposed between the cover and drive mechanism; and a vibration absorber adhered to an outer surface of the cover in a vibration range of a connecting mechanism.

With the recording disk apparatus, the vibration absorber absorbs vibration transmitted to the cover from the drive mechanism via the connecting mechanism. Accordingly, noise caused by the vibration may be suppressed even in case where the cover is formed by deep-drawing. The employment of deep-drawing can provide cheaper housings of recording disk apparatuses, leading to reduction in the price of computer apparatuses such as personal computers.

The vibration absorber may be disposed in a recess formed on the outer surface of the cover, so that the vibration absorber can easily be positioned on the outer surface of the cover. In particular, the face of the vibration absorber is level with the outer surface of the cover may lead to a superior appearance of the housing.

The connecting mechanism is preferably received in a void formed in the vibration absorber. In general, the thickness of the housing is supposed to be the maximum at a portion of the connecting mechanism in the recording disk apparatuses such as HDDs. Accordingly, the vibration absorber being absent from the portion around the connecting mechanism serves to avoid the increase in thickness of the housing. For example, general HDDs have a standard for the height of a housing, so that such vibration absorber can provide a larger interior space in the housing with a standardized height.

Further, according to a second aspect of the present invention, there is provided a recording disk apparatus comprising: a recording disk; a head; a carriage on which the head is mounted; a carriage axis supporting the carriage for rotation; a housing accommodating at least the carriage axis; a connecting mechanism provided between the carriage axis and housing; and a vibration absorber adhered to an outer surface of the housing, with a void in which the connecting mechanism is disposed.

With the recording disk apparatus, the vibration absorber absorbs vibration transmitted to the cover from the carriage via the connecting mechanism. In general, the thickness of the housing is supposed to be the maximum at a portion of the carriage axis in the recording disk apparatuses such as HDDs. Accordingly, the vibration absorber being absent from the portion around the connecting mechanism serves to avoid the increase in thickness of the housing. For example, general HDDs have a standard for the height of a housing, so that such vibration absorber can provide a larger interior space in the housing with a standardized height. In particular, since the vibration absorber is adhered to the outer surface of the cover, the operation of the recording disk apparatus cannot be deteriorated in the case where the gas is generated from an adhesive or a double-sided adhesive tape employed to attachment of the vibration absorber, or the vibration absorber peels off from the cover.

The vibration absorber is disposed in a recess formed on the outer surface of the cover, so that the vibration absorber can easily be positioned on the outer surface of the cover. In particular, the face of the vibration absorber is level with the outer surface of the cover may lead to a superior appearance of the housing.

In any of the aspects, the vibration absorber can cover not only over the vibration range in the vicinity of the connecting mechanism but also over a vibration range of a rotation axis connecting mechanism which connects the cover and a rotation axis supporting the recording disk for rotation. With this arrangement, a single vibration absorber can serve to absorb vibrations from the connecting mechanism and from the rotation axis connecting mechanism. This reduces production cost and contribute to an improved efficiency in working operation.

Moreover, a further vibration absorber is superposed on the aforementioned vibration absorber for covering over the vibration range of the rotation axis connecting mechanism. In general, there is more margin within the cover around the rotation axis connecting mechanism than the connecting mechanism, so that the further vibration absorber may contribute to reduction in noise without hindering disposition of components at the vibration range of the rotation axis connecting mechanism.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
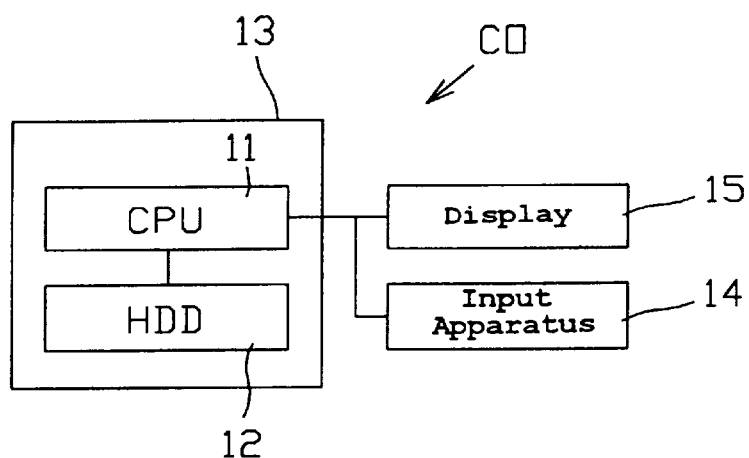
FIG. 1 schematically illustrates the structure of a computer apparatus.

FIG. 1 schematically illustrates the structure of a computer apparatus CO. The computer apparatus CO includes a processing system 13 comprising a central processing unit (CPU) 11, and a hard disk drive unit (HDD) 12 as a recording disk apparatus according to the present invention. The CPU 11 is capable of providing the HDD 12 with electric data and receiving electric data from the HDD 12, in line with instructions from input apparatus 14, such as a keyboard or a mouse, connected to the processing system 13. Electric data received from the HDD 12 can be displayed on a screen of a display apparatus 15 connected to the processing system 13.

Figure 2:
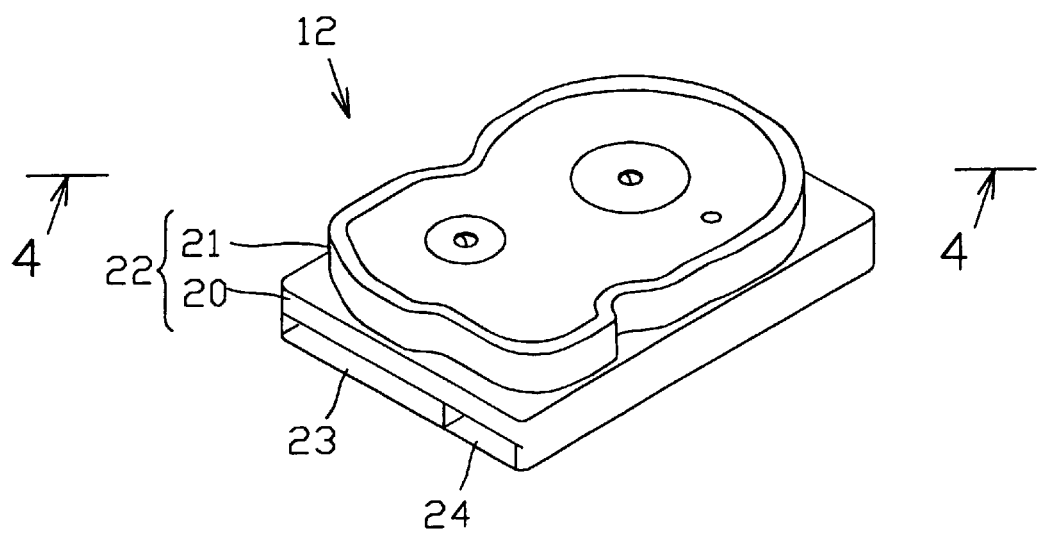
FIG. 2 is a perspective view illustrating a hard disk drive unit (HDD) according to a first embodiment of the present invention.

FIG. 2 illustrates the perspective view of the HDD 12 according to a first embodiment of the present invention. The HDD 12 includes a housing 22 which comprises a base plate 20 formed by aluminum die-casting and an aluminum cover 21 which is coupled to the base plate 20. The cover 21 is formed by deep-drawing using a press. A control circuit formed on a substrate, not shown, is assembled into the rear surface of the base plate 20. The substrate is connected to a control port of the CPU 11 through a connector 23 for control line, and to a power supply of the computer apparatus CO through a connector 24 for power supply.

Figure 3:
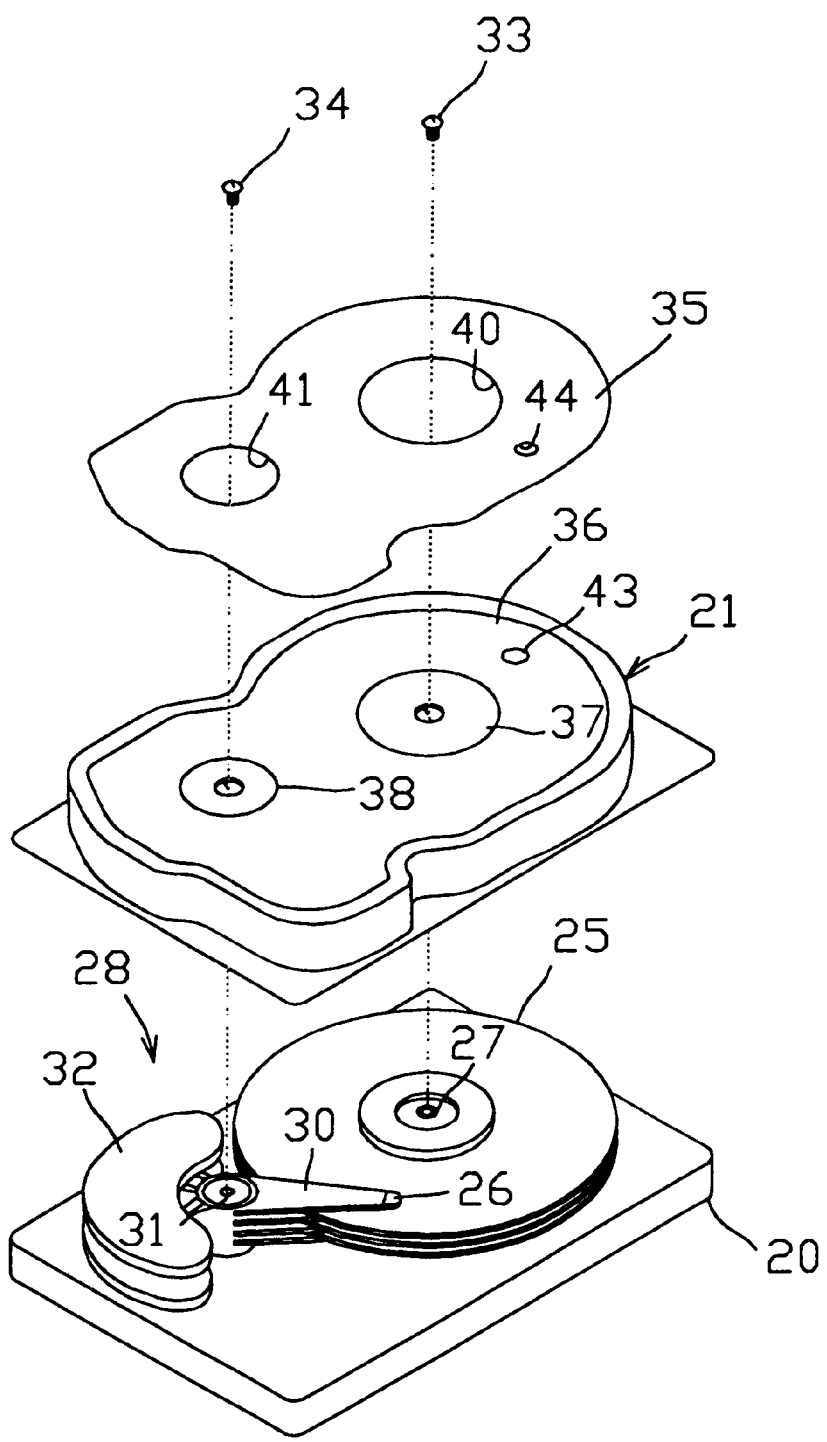
FIG. 3 is an exploded view of the HDD.

The HDD 12 comprises, as is apparent from FIG. 3, a plurality of magnetic disks 25 as recording disks into which electric data are recorded, and magnetic heads 26 opposed to surfaces of the respective magnetic disks 25 so as to read/write electric data to/from the disks 25. The magnetic disks 25 are rotatable about a rotation axis 27 fixed on the base plate 20. The rotation of the magnetic disks 25 is managed by a spindle motor, not shown. The magnetic heads 26 are displaced and positioned with respect to the magnetic disks 25 by the operation of a drive mechanism 28 mounted on the base plate 20.

The drive mechanism 28 includes a carriage 30 on which the magnetic heads 26 are mounted. The carriage 30 is rotatably supported by a carriage axis 31 fixed on the base plate 20. The carriage 30 can swing about the carriage axis 31 by the operation of an actuator consisting of a magnetic circuit 32. When the cover 21 is coupled to the base plate 20, the housing 22 accommodates the magnetic disks 25, magnetic heads 26, and the drive mechanism 28.

A first screw 33 as a connecting mechanism is screwed, penetrating through the cover 21, into the tip end of the rotation axis 27, in the condition in which the cover 21 is superposed on the base plate 20. The rotation axis 27 and cover 21 are coupled to each other. A second screw 34 as a connecting mechanism is likewise screwed, penetrating through the cover 21, into the tip end of the carriage axis 31, in the same condition. The carriage axis 31 of the drive mechanism 28 and the cover 21 are consequently coupled to each other.

A vibration absorber plate 35 is adhered to the outer surface of the cover 21. The vibration absorber plate 35 is positioned by a recess 36 of the identical shape formed on the outer surface of the cover 21. A circular first accommodating section 37 protrudes from the bottom of the recess 36 in the vicinity of a portion receiving the first screw 33. The first accommodating section 37 serves to accommodate a bearing disposed at the tip end of the rotation axis 27. A circular second accommodating section 38 likewise protrudes from the bottom of the recess 36 in the vicinity of a portion receiving the second screw 34. The second accommodating section 38 serves to accommodate a bearing disposed at the tip end of the carriage axis 31. A first void 40 is formed in the vibration absorber plate 35, so as to receive the first accommodating section 37 when the vibration absorber plate 35 is adhered to the outer surface of the cover 21. A second void 41 is also formed in the vibration absorber plate 35 so as to likewise receive the second accommodating section 38. When the vibration absorber plate 35 is adhered to the outer surface of the cover 21, the face of the vibration absorber plate 35 is leveled with the upper surfaces of the first and second accommodating section 37, 38 as shown in FIG. 4.

A communication hole 43 is formed in the bottom of the recess 36. The communication hole 43 penetrates through the cover 21 leading to the interior of the housing 22. A breath bore 44 is formed in the vibration absorber plate 35 at location shifted from the position of the communication hole 43. The communication hole 43 and breath bore 44 are connected to each other through a communication passage 45 shown in FIG. 4 when the vibration absorber plate 35 is adhered to the cover 21.

Figure 4:
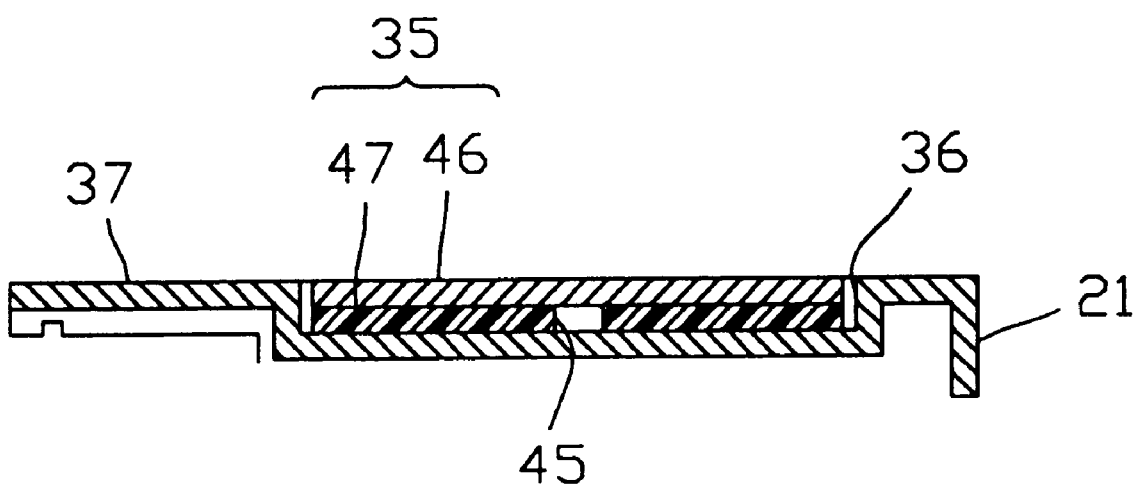
FIG. 4 is a partially enlarged sectional view taken along the line 4—4 in FIG. 2.

The suppression absorber plate 35 comprises, as shown in FIG. 4, a metallic plate 46 and a vibration absorber material 47 adhered to the rear surface of the metallic plate 46. The vibration absorber material 47 may, for example, consist of a double-sided adhesive tape with high elasticity. The communication passage 45 is formed by eliminating a part of vibration absorber material 47. Variation in pressure within the housing 22 can be absorbed by the operation of the communication passage 45, the communication hole 43 and the breath bore 44. Moreover, the long and slender communication passage 45 serves to catch dust and the like which are introduced from the breath bore 44, thereby not allowing dust to reach the interior of the housing 22.

Next, a description will be made of production of the HDD referring to FIG. 3. The first step comprises forming the base plate 20 by aluminum die-casting. The formed base plate 20 is then finished. Components such as the spindle motor, the magnetic disks 25, the drive mechanism 28, and the like are mounted or set on the base plate 20. The substrate may be then attached to the rear face of the base plate 20.

The completion of mounting of the components will be followed by coupling o the cover 21 superposed on the base plate 20. The cover 21 has been prepared by deep-drawing an aluminum plate using a press. The process of deep-drawing also makes the recess 36, and the first and second accommodating sections 37, 38 in the wall of the cover 21.

The vibration absorber plate 35 is then adhered to the outer surface of the cover 21. The vibration absorber plate 35 is fitted into the recess 36, so that the upper surfaces of the first and second accommodating sections 37, 38 are level with the face of the vibration absorber plate 35. In general, the thickness Of the housing 22 is at its maximum at portions around the rotation axis 27 and carriage axis 31 in HDDs. Accordingly, the vibration absorber plate 35 being absent from the portions around the rotation axis 27 and carriage axis 31 serve to avoid the increase in thickness of the housing 22. In particular, general HDDs have a standard for the height of a housing, so that such vibration absorber plate 35 can provide a larger interior space in the housing 22 with a standardized height.

The HDD 12 is assembled into the housing of the computer apparatus CO using HDD 12. The HDD 12 is connected to the CPU 11 through the connector 23 for control line and the main power supply through the connector 24 for power supply. When the CPU 11 provides instructions to read or write information data, the control circuit on the substrate operates to allow the magnetic disks 25 to rotate about the rotation axis 27 and the carriage 30 to swing around the carriage axis 31.

In the seek operation, for example, the vibration of the rotating magnetic disks 25 is transmitted to the cover 21 through the rotation axis 27 and the first screw 33. The vibration of the swinging carriage 30 is also transmitted to the cover 21 through the carriage axis 31 and the second screw 34. Vibration consequently spreads on the cover 21 over a vibration range in the vicinity of the first screw 33 and a vibration range in the vicinity of the second screw 34. The spread vibration is absorbed by the vibration absorber plate 35 covering over both of the vibration ranges. Accordingly, noise caused by the vibration of the cover 21 is suppressed. An experiment has revealed that the disposition of the vibration absorber plate 35 in the vicinity of the second screw 34 accomplishes reduction of over 2 dB in noise as compared with one with no absorber in the vicinity of the second screw 34.

It should be noted that the first and second voids 40, 41 may take a shape other than a circle. The shape of the voids 40, 41 depends on the shape of the first and second accommodating sections 37, 38. Also, the first and second voids 40, 41 need not be separated from the outer periphery of the vibration absorber plate 35. The voids 40, 41 may be formed continuous from the periphery of the vibration absorber plate 35. Further, although a single vibration absorber plate 35 covers over the vibration ranges in the vicinity of both the first and second screws 33, 34, separate vibration absorber plates may cover over the respective vibration ranges.

Figure 5:
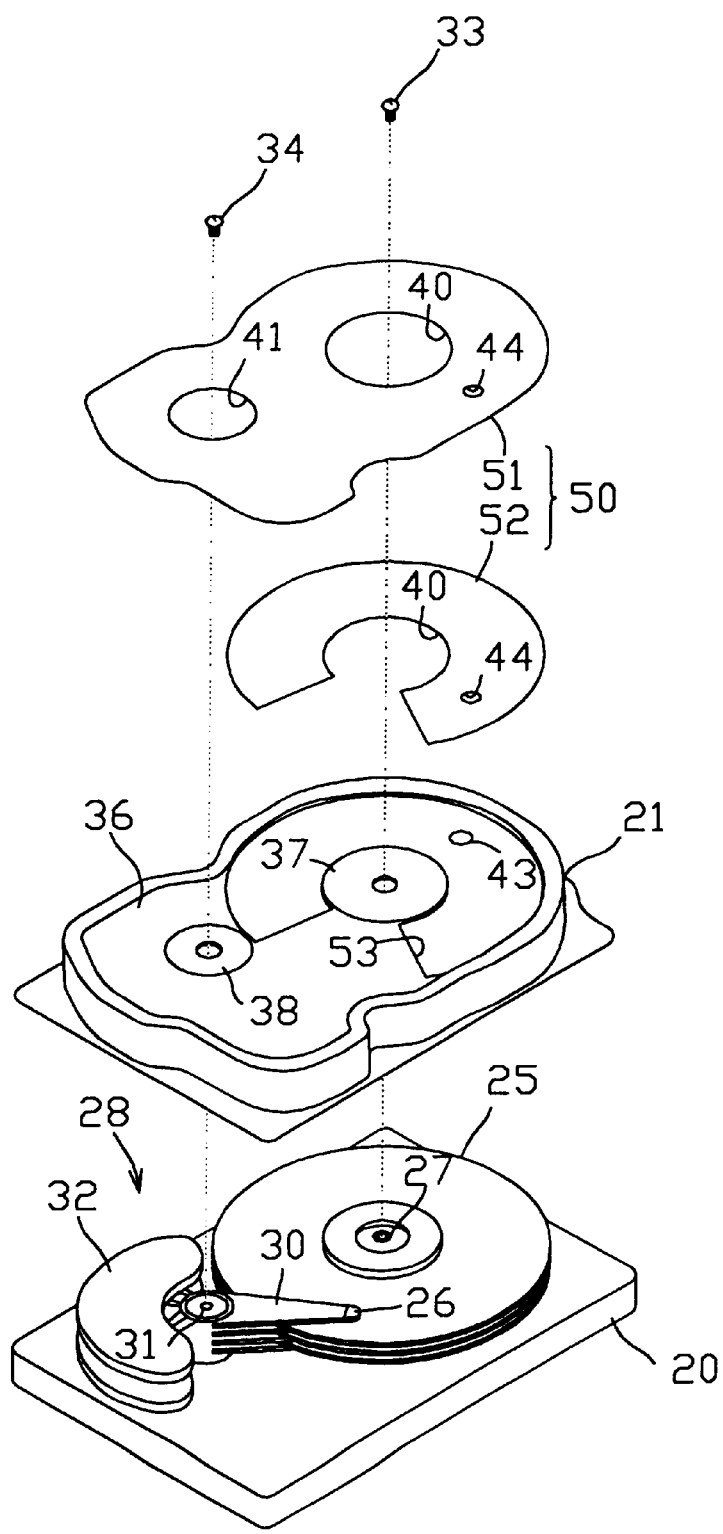
FIG. 5 is an exploded view of a hard disk drive unit (HDD) according to a second embodiment of the present invention.

FIG. 5 illustrates an HDD as a recording disk apparatus according to a second embodiment of the present invention. The second embodiment is characterized by variation in thickness of the vibration absorber plate in the vicinity of the first and second screws 33, 34. Specifically, a vibration absorber plate 50 includes a main vibration absorber plate 51 identical to the vibration absorber plate 35 of the first embodiment and a sub vibration absorber plate 52 reinforcing the thickness of the main vibration absorber plate 51 in the vicinity of the first screw 33. A deeper recess 53 is formed on the bottom of the recess 36 so as to correspond to the sub vibration absorber plate 52. When the sub vibration absorber plate 52 is adhered to the deeper recess 53, the face of the sub vibration absorber plate 52 is level with the bottom of the recess 36. The main vibration absorber plate 51 is adhered all over this planar bottom of the recess 36. Note that components achieving the same function as of the first embodiment are identified by the same reference numerals or characters and a detailed explanation thereof is omitted.

With the above arrangement, absorption of vibration over the vibration range in the vicinity of the first screw 33 is more efficient than that over the vibration range in the vicinity of the second screw 34 since the vibration range in the vicinity of the first screw 33 is covered with the thicker vibration absorber plate 50. Since the deeper recess 53 is formed in a range where the thickness of the components mounted on the base plate 20 is relatively small, the formation of the deeper recess 53 does not require additional reduction in the thickness of the components.

Figure 6:
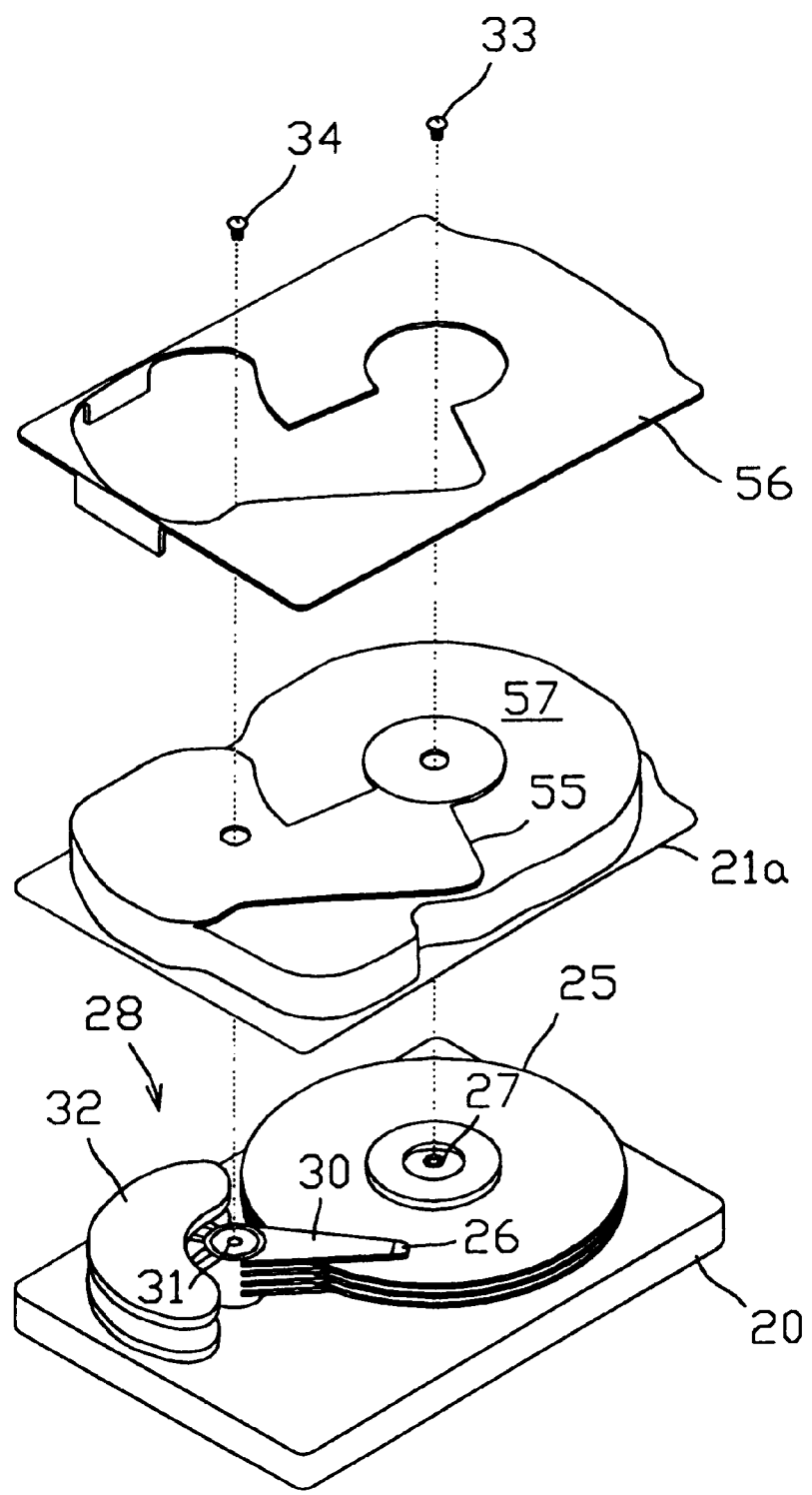
FIG. 6 is an exploded view of a hard disk drive unit (HDD) according to a third embodiment of the present invention.

FIG. 6 illustrates an HDD as a recording disk apparatus according to a third embodiment of the present invention. In this third embodiment, an integral accommodating section 55 is formed on the outer surface of the cover 21*a* in the vicinity of the first, and second screws 33, 34. This integral accommodating section 55 may achieve the functions of both of the aforementioned first and second accommodating sections 37, 38. A stage 57 is formed on the cover 21*a* around the integral accommodating section 55 so as to receive the thickness of a vibration absorber plate 56. The vibration absorber plate 56 is adhered to the stage 57 for defining the outline of the housing 22. The face of the adhered vibration absorber plate 56 is leveled with the upper surface of the integral accommodating section 55. This arrangement also enables the vibration absorber plate 56 to cover over the vibration range in the vicinity of the first and second screws 33, 34 without reducing the interior space within the housing 22.

What is claimed is:

1. A recording disk apparatus comprising:

a recording disk;

a head;

a drive mechanism adapted to displace said head with respect to said recording disk;

a base having a generally planar upper surface on which at least said drive mechanism is mounted;

a metallic cover formed by deep-drawing and configured to house at least said drive mechanism when said cover is coupled to said base;

a connecting mechanism adapted to couple said cover to said drive mechanism; and a vibration absorber adhered to an outer surface of said cover in a vibration range of said connecting mechanism.

2. The recording disk apparatus as defined in claim 1, wherein said vibration absorber is disposed in a recess formed on said outer surface of the cover.

3. The recording disk apparatus as defined in claim 1, wherein said connecting mechanism is received in a void formed in said vibration absorber.

4. The recording disk apparatus as defined in claim 1, wherein said vibration absorber covers a vibration range of a rotation axis connecting mechanism which connects said cover and a vibration range of a rotation axis supporting said recording disk for rotation.

5. The recording disk apparatus as defined in claim 4, wherein said vibration absorber is disposed in a recess formed on said outer surface of the cover.

6. The recording disk apparatus as defined in claim 4, wherein said connecting mechanism is received in a void formed in said vibration absorber while said rotation axis connecting mechanism is received in a further void formed in said vibration absorber.

7. The recording disk apparatus as defined in claim 4, further comprising a further vibration absorber superposed on said vibration absorber for covering said vibration range of said rotation axis connecting mechanism.

8. The recording disk apparatus as defined in claim 7, wherein said vibration absorber and said further vibration absorber are both disposed in said recess formed on said outer surface of said cover.

9. The recording disk apparatus as defined in claim 7, wherein said connecting mechanism is received in a void formed in said vibration absorber while said rotation axis connecting mechanism is received in a further void formed in said vibration absorber and void formed in said further vibration absorber.

10. A recording disk apparatus comprising:

a recording disk;

a head;

a carriage on which said head is mounted;

a carriage axis supporting said carriage for rotation;

a housing accommodating at least said carriage axis;

a connecting mechanism provided on an outwardly protruding portion of said housing for coupling said carriage axis to said housing; and a vibration absorber adhered to an outer surface of the housing, said vibration absorber having a void in which said protruding portion is disposed.

11. The recording disk apparatus as defined in claim 10, wherein said vibration absorber is disposed in a recess formed on said outer surface of said housing.

12. The recording disk apparatus as defined in claim 10, wherein said vibration absorber comprises a further void in which a rotation axis connecting mechanism which connects said housing and a rotation axis supporting said recording disk for rotation is disposed.

13. The recording disk apparatus as defined in claim 12, wherein said vibration absorber is disposed in a recess formed on said outer surface of said housing.

14. The recording disk apparatus as defined in claim 12, further comprising a further vibration absorber superposed on said vibration absorber, with a void in which said rotation axis connecting mechanism is disposed.

15. The recording disk apparatus as defined in claim 14, wherein said vibration absorber and said further vibration absorber are both disposed in a recess formed on said outer surface of said housing.

16. A recording disk apparatus comprising:

a recording disk;

a head;

a drive mechanism adapted to displace said head with respect to said recording disk;

a base having a generally planar upper surface on which at least said drive mechanism is mounted;

a metallic cover configured to house at least said drive mechanism when said cover is coupled to said upper surface of the base;

a connecting mechanism adapted to couple said cover to said drive mechanism; and a vibration absorber adhered to an outer surface of said cover in a vibration range of said connecting mechanism.

17. The recording disk apparatus according to claim 16, wherein said cover includes a side wall portion designed to stand on said generally planar upper surface of said base.

18. The recording disk apparatus according to claim 16, wherein said vibration absorber extends to surround said connecting mechanism at said outer surface of said cover.

* * * * *